Dec. 9, 1941.　　　P. A. KINZIE　　　2,265,176

PRESSURE-SEALED VALVE

Filed April 22, 1938　　　4 Sheets-Sheet 1

INVENTOR.
Phillip A. Kinzie

BY 
ATTORNEY.

Dec. 9, 1941.   P. A. KINZIE   2,265,176
PRESSURE-SEALED VALVE
Filed April 22, 1938   4 Sheets-Sheet 2

INVENTOR.
Phillip A. Kinzie
BY
ATTORNEY.

Dec. 9, 1941.   P. A. KINZIE   2,265,176
PRESSURE-SEALED VALVE
Filed April 22, 1938   4 Sheets-Sheet 3

INVENTOR.
Phillip A. Kinzie
BY
ATTORNEY.

Dec. 9, 1941.                P. A. KINZIE                2,265,176
                        PRESSURE-SEALED VALVE
                        Filed April 22, 1938            4 Sheets-Sheet 4

INVENTOR.
Phillip A. Kinzie
BY
ATTORNEY.

Patented Dec. 9, 1941

2,265,176

UNITED STATES PATENT OFFICE 2,265,176

PRESSURE-SEALED VALVE

Phillip A. Kinzie, Denver, Colo., assignor to Universal Hydraulic Corporation, Denver, Colo., a corporation of Colorado Application April 22, 1938, Serial No. 203,540

13 Claims. (Cl. 251—56)

In general, this invention relates to a gate valve or apparatus of a similar character for controlling the flow of fluid through an orifice or passageway and includes an improved method for positively interrupting the flow of fluid when the movable closure member is in its closed position across the orifice. The invention features a hydraulically actuated sealing means whereby sealing is effected in a plane substantially parallel to the plane of movement of the closure member, adjacent its upstream or downstream face, and whereby cooperating sealing surfaces on the member and at the perimeter of the orifice are forced into contact by means of a diaphragm element operating in response to differential fluid pressures on opposite sides thereof. The diaphragm element is made retractable in order that a separation may be maintained between the sealing surfaces while the closure member is being moved either to or from the closed position.

In particular, the invention relates to the construction and actuation of a hydraulically actuated diaphragm seal, to the disposition of such a seal in relationship to the orifice-closure means and orifice, to the arrangement of appurtenant sealing elements on and adjacent to the orifice closure means, to the roller mounting of an orifice closure means, to the adaption of the seal to closed conduit or open reservoir orifice-closure means, and to several shapes of orifices.

Units of the type hereinafter described and illustrated are commonly used on dams for shutting off the flow of water through a penstock or conduit. Inasmuch as the head pressures in such installations are commonly quite high, it is desirable that friction between the movable and stationary elements of an orifice closure means or valve be held to a minimum to avoid excessively powerful and bulky hoisting units, which are objectionable not only from the standpoint of size and cost, but also from the fact that in effecting movement of a gate wherein the sealing element on the gate is in sliding contact with the cooperating element around the orifice, a powerful hoisting unit would expend much of its energy in overcoming friction and in so doing would actually cause damage to the sealing means. For these reasons, the leaf is mounted upon a rolling means, adjacent to the sides of the orifice, and the sealing element on the closure means, for example, is made retractable so that it comes into contact with the stationary members of the unit only after movement of the closure means has ceased. The invention by adherence to these principles provides a very efficient means for interrupting the flow of a fluid.

It is to be understood, however, that the invention is by no means limited to high head pressures or to dams and penstocks; for it is adaptable to the use in domestic water supply mains, oil and gas pipe-lines, steam lines, and to the many kindred types of applications.

The economic value of the invention is illustrated by a comparison of weights for a 102" diameter gate using a different type of sealing unit and a different method of reducing the frictional resistance to the ones embodied in this invention. The weight of the prototype is 167,000# whereas the weight of the gate depicted in the invention is 146,000#.

An object of the present invention is to provide a means for controlling the flow of fluid through an orifice wherein the closure member may be moved with a minimum of effort, and wherein fluid-tight sealing is effected at the perimeter of the orifice when the movable closure member or gate is in its closed position. Another object is in the formation of a seal between a movable closure member and a cooperating seat around the orifice, wherein the plane of sealing is substantially parallel to the plane of movement of the closure member, and the cooperating sealing surfaces are in contact only after movement of the closure member has ceased, and wherein a separation is maintained between such sealing surfaces while the closure member is being moved either to or from the closed position.

An additional object is to provide a sealing means actuated by fluid pressure, for example, by pressure of the controlled fluid, said means being adaptable to any shape of orifice and permitting accommodation of the sealing element thereof to moderate deviations from a true plane of the cooperating seat; said means including a hydraulically actuated diaphragm element responsive to fluid pressure variations and movable axially of the orifice, whereby the sealing surfaces associated with the gate and the orifice, respectively, are forced into contact to complete the seal or, by retraction of the diaphragm element, are maintained in spaced relation during opening and closing movements of the gate.

A further object is to provide sealing between a movable gate and its seat wherein the sealing element is resiliently supported and maintained free of sliding contact with any other part.

The invention also has as an object, a sealing element wherein the contact surface thereof is shaped to resist the passage of fluid when the element is seated, and wherein greater contact pressure with the cooperating seat is obtained.

Other objects of the invention include a hydraulically actuated sealing means wherein, in combination with one or more of the foregoing features, a sealing element is resiliently mounted on, or contained in, an orifice closure member; wherein liberal clearances between the movable sealing element and the retaining elements are maintained to insure proper functioning of the seal despite possible formation of scale on the surfaces thereof; and wherein actuation of said sealing element is controlled through connections to stationary members of the unit.

For the purpose of clarifying the objectives of the invention, and for pointing out in more detail the many distinctive and advantageous features, the invention will now be described with particular reference to the specific embodiments which are illustrated on the accompanying drawings, wherein.

Figure 1:
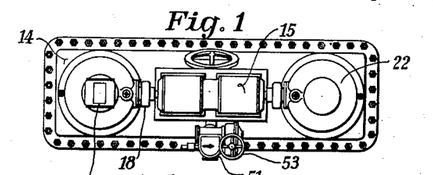
Fig. 1 is a plan view of a gate structure embodying the invention.
Figure 2:
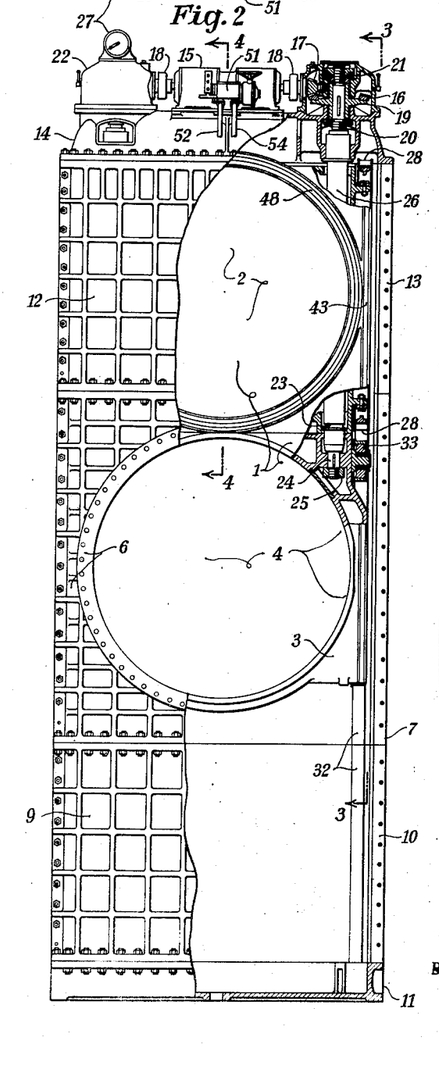
Fig. 2 is a part upstream elevation and a part sectional elevation.
Figure 3:
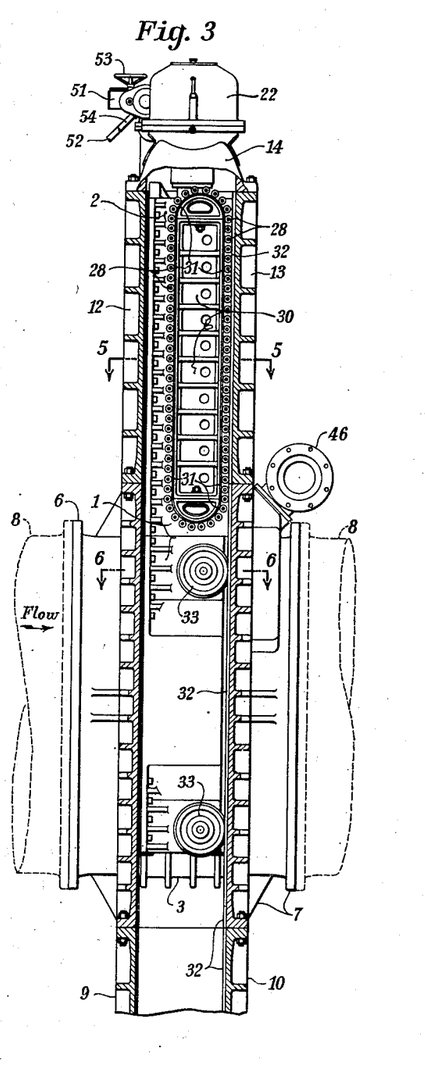
Fig. 3 is a section taken on the plane 3—3 of Fig. 2.
Figures 4, 5, 6, 7, 8, 9, 10, 11:
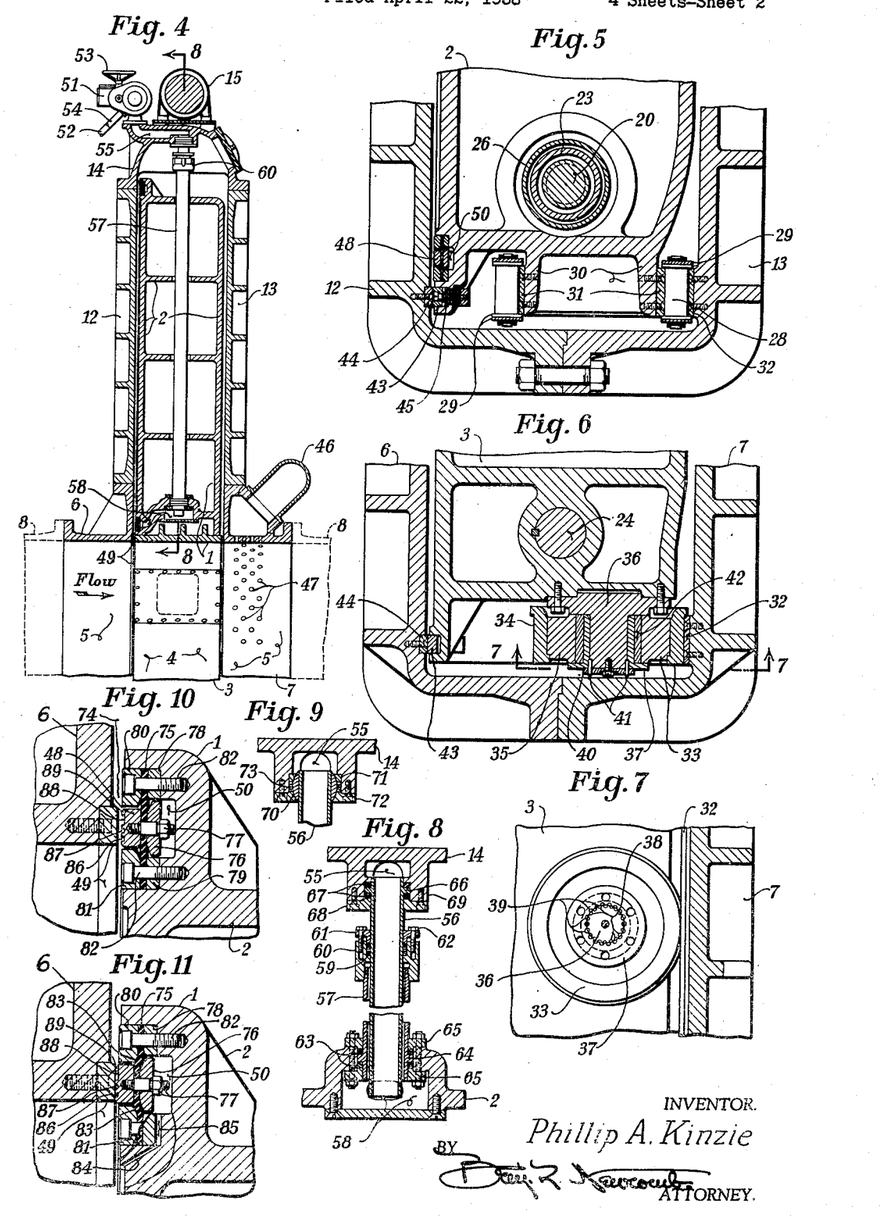
Fig. 4 is a section taken on the plane 4—4 of Fig. 2.
Fig. 5 is a section taken on the plane 5—5 of Fig. 3.
Fig. 6 is a section taken on the plane 6—6 of Fig. 3.
Fig. 7 is a section taken on the plane 7—7 of Fig. 6.
Fig. 8 is a section taken on the plane 8—8 of Fig. 4.
Fig. 9 is a fragmentary section showing an alternate construction to that shown on Fig. 8.
Fig. 10 is a fragmentary section taken on the vertical center line of the gate structure adjacent to the top of the orifice therethrough, and shows the gate closed but the seal unseated.
Fig. 11 is a fragmentary section similar to Fig. 10, but showing the seal seated.

By reference to the accompanying drawings it will be seen in the first embodiment—Figs. 1 to 11 inclusive—that the orifice-closure member or leaf 1 is composed of two elements, a bulkhead 2 and a ring-follower section 3 having therethrough a fluidway 4—Figs. 2 and 4—which coincides in size and shape with the fluidways 5—Figs. 2, 4, 10, and 11—through the upstream body member 6—Figs. 2, 3, and 4—and the downstream body member 7. Fluid is delivered to and through the fluidways 4 and 5 by the pipe or conduit members 8. The leaf 1 is further encased by the lower upstream bonnet 9—Figs. 2 and 3—the lower downstream bonnet 10, the lower bonnet cover 11, the upper upstream bonnet 12—Figs. 2, 3, 4, and 5—the upper downstream bonnet 13, and the upper bonnet cover and hoist case 14.

The operations in closing the fluidway 5 consist of two principal actions, namely, the lowering of the leaf 1 to a position whereby the bulkhead element 2 will obstruct the fluidway 5, and the actuating of the sealing means to effect a seal between the leaf bulkhead 2 and the upstream body member 6.

In order to lower or raise the leaf 1, a lifting means is provided and functions through a motor and speed reducer 15—Figs. 1, 2, and 4—which drives dual bevel gears 16 by the bevel pinions 17 through the flexible couplings 18. The hubs 19—Fig. 2—to which the bevel gears 16 are bolted, is keyed to lifting stems 20—Figs. 2 and 5—which are supported by ball bearings 21 in the gear housing 22. The downwardly extending portions of the lifting stems 20 are threaded into a nut on the lifting tube 23—Figs. 2 and 5—which is fitted with a tube extension 24 at its lower termination. The tube extension 24 is prevented from rotating by being keyed into the ring follower element 3—Figs. 2 and 6—and serves to join and align the bulkhead and ring follower elements comprising the leaf 1 by means of a shoulder which bears downward on the bulkhead 2 and by the nut 25—Fig. 2—which bears upward on the ring follower 3. The baffle tube 26—Figs. 2 and 5—performs a function in sealing the stem which will not be described herein.

The unit 27—Figs. 1 and 2—indicates the position of and electrically controls the travel of the leaf 1.

The leaf bulkhead 2 is mounted on rollers 28—Figs. 2, 3, and 5—which are joined by the links 29 to form roller trains which travel around the oval-shaped elements 30 on the sides of the leaf bulkhead 2. The oval-shaped portion 30 is covered with the non-corrodible tracks 31—Figs. 3 and 5—and cooperating non-corrodible tracks 32 are attached to the downstream body, and bonnet members—Figs. 2, 3, 5, 6, and 7. The ring follower 3 is mounted on the wheels 33—Figs. 2, 3, 6, and 7—which have a non-corrodible rim 34—Fig. 6—pressed on the central portion 35 thereof. The wheel is retained on the ring follower 3 by the trunnion 36, and is rendered adjustable thereon by the eccentric bushing 37—Figs. 6 and 7. A fine degree of adjustment for the wheel 33 is obtained by having a series of half-round holes 38 in the end of the trunnion 36—Fig. 7—and another series of half-round holes 39 in the end of the eccentric bushing 37. By having more half-round holes in one member than in the other a differential is obtained which permits very fine adjustment of the wheel to be made and insures the proper degree of bearing for the wheel 33 on the track 32. The cover plate 40 in which the pins 41 are set provides a means for locking the eccentric bushing 37 when proper adjustment is secured. A self-lubricating bushing 42, which is pressed into central portion 35 of the wheel 33, eliminates the need for hand lubrication and insures proper functioning of the unit.

The bar 43—Figs. 2, 5, and 6—which is forced outward into contact with a cooperating bar 44 in the upstream body and bonnet members, by the springs 45 insures proper contact of the rollers 28 and the wheels 33 upon the non-corrodible tracks 32. This means of holding the rollers 28 and the wheels 33 tightly into contact with the non-corrodible tracks 32 is advantageous in overcoming the tendency for the leaf to vibrate during closure. This tendency is further lessened by admitting air to the fluidway 5 from the manifold 46—Figs. 3 and 4—through the holes 47 in the downstream body member 7—Fig. 4.

Assuming that the leaf 1 has been lowered by the means hereinbefore described and that the leaf bulkhead 2 is covering the fluidway 5 in the upstream body member 6 as shown on Fig. 10, the sealing element 48 must be forced against the stationary seat 49 as shown on Fig. 11, in order to effect fluid-tight sealing at the perimeter of the orifice.

In order to force the seal ring 48 outward against the seat 49 it is necessary to introduce fluid under pressure into the annular space 50—Figs. 5, 10, and 11—behind the seal. The actuating fluid pressure, which may be the same as that of the controlled fluid, is supplied by means of pipe 52 to the control valve 51—Figs. 1, 2, 3, and 4—which is essentially a three-way valve with the addition of an electrical means for preventing movement of the gate leaf 1 when the seal 48 is in contact with the seat 49.

When the handwheel 53 on the control valve 51 is rotated then, the annular space 50 will be brought into communication with the pressure pipe 52 and at the same time be taken out of communication with the drain pipe 54. Communication between the control valve 51 and the annular space 50 is effected through the passageway 55—Figs. 4, 8 and 9—the telescoping tubes 56 and 57, and the passageway 58—Figs. 4 and 8. The packing 59—Fig. 8—which is set into the stuffing box 60 on the telescoping tube 57 and which is retained by the gland 61 and the cap-screws 62, renders the junction of the telescoping tubes fluid tight. Dual resilient packings 63—Fig. 8—which are held snugly against the collar 64 on the telescoping tube 57 by the flanges 65, provide a flexible fluid-tight joint with the leaf 1. A similar collar 66 on the telescoping tube 56, together with the resilient packings 67 and retaining flange 68 secure and seal the telescoping tube to the flange 69 on the upper bonnet cover and hoist case 14. It is essential that there be some flexibility in the connections of the telescoping tubes 56 and 57 with their respective parts, since the leaf is subject to a certain amount of lateral misalignment because of the clearances necessary at the rollers 28. By reason of the fact that the collars 64 and 66 on their respective tubes are held between resilient packings 63 and 67, correction is made for such minor misalignments as may occur.

An alternate method of securing flexibility at the connection of the telescoping tubes with their respective members is illustrated in Fig. 9. In this embodiment the upper termination of the telescoping tube 56 is fitted with a spherical element 70 which is retained by the seat 71 and the flange 72. The packing 73 renders the joint fluid tight.

Since by the means hereinbefore described, pressure substantially the same as that of the controlled fluid is admitted to the annular space 50 behind the seal and since the clearance 74—Fig. 10—between the leaf 1 and the seat 49 is made considerably less than the clearance between the leaf and body member 7 at the downstream face of the leaf, there will exist a hydraulic unbalance of the forces acting upon the flexible diaphragm 75 to which the seal 48 and stop ring 76 are attached by the studs 77; and since the force acting outward will be the greater, the seal 48 will be forced outward on to the seat 49 and seal the periphery of the fluidway 5 in the upstream body member 6 as illustrated in Fig. 11.

The flexible diaphragm 75 is resilient, being made of rubber or a similar material. The diaphragm is clamped between the liner rings 78 and 79 and the clamp rings 80 and 81, and is secured to the leaf by the capscrews 82. The seal 48, seat 49, stop ring 76, liner rings 78 and 79, and the clamp rings 80 and 81 are all made of a non-corrodible material to insure proper functioning in corrosive fluids.

It will be noticed that inasmuch as the seal 48 is supported by the flexible diaphragm 75, liberal clearances can be left all around the seal 48, a feature which insures free and positive operation of the seal, since no surfaces thereof are in sliding contact with other surfaces. In addition, the liberal clearances are a distinct advantage in fluids of scale-forming propensities, since a considerable degree of scaling would be necessary in order to impair the functioning of the seal. It will also be noticed—Fig. 11— that the sloping edges 83 of the clamp rings 80 and 81 support the diaphragm while the annular space 50 is under pressure, and that the stop ring 76 will act to prevent too great a movement of the seal 48 should pressure be introduced to the annular space 50 while the leaf 1 is not in the closed position.

The drilled hole 84 in conjunction with the groove 85—Fig. 11—serve to vent the air from the annular space 50. It will be noted that, inasmuch as the drilled hole is in communication with pressure in the fluidway which is the same as that in the annular space 50, no escape of fluid will occur; yet the annular space is adequately and automatically freed of entrapped air which might cause erratic functioning of the seal 48.

The contact surface of the seal 48 upon the seat 49 has the three concentric annular grooves 86, 87, and 88—Figs. 9 and 10—cut therein to assist in making the seal fluid tight. The grooves 86 and 87 are resistance grooves. The wider groove 88 is a means for relieving back pressure from the contact surface of the seal 48, since the slots 89, which are cut through the outer contact ring, will allow the fluid which passes the inner contact surfaces to escape to the interior of the gate housing. The gate housing will not be subjected to fluid pressure since the fluid will drain out through the fluidway 5 in the downstream body member 7 when the leaf 1 is in the closed position. By means then of relieving the groove 88 of fluid pressure, approximately one-half of the width of the annular ring 48 will be subject to no back pressure, and with pressure maintained in space 50, this condition will increase the outward force upon the seal 48. In addition to the primary functions of the grooves 86, 87, and 88, they function in another way; for since they reduce the contact area of the seal 48, there will be a proportional increase in the intensity of the contact pressure between 48 and 49 produced by hydraulic pressure in the annular space 50 which will materially aid in insuring a fluid-tight seal between 48 and 49.

Inasmuch as in forcing the seal 48 outward on the seat 49 the flexible diaphragm 75 will have to stretch slightly, when pressure is relieved from the annular space 50, preparatory to raising the diaphragm leaf 1, the stretch or tension in the diaphragm will draw the seal 48 inward and out of contact with the seat 49. It will, furthermore, be noted—Fig. 11—that, since an unbalanced hydrostatic pressure will exist on the inner portion of the seal 48 when pressure is released from the annular space 50, a force will be transmitted through the flexible diaphragm 75 to the stop ring 76. Thus the fluid pressure from the fluidway 5 will assist in the retraction of the seal 48 by exerting an inward force on the stop ring 76.

Figures 12, 13, 14, 15, 16:
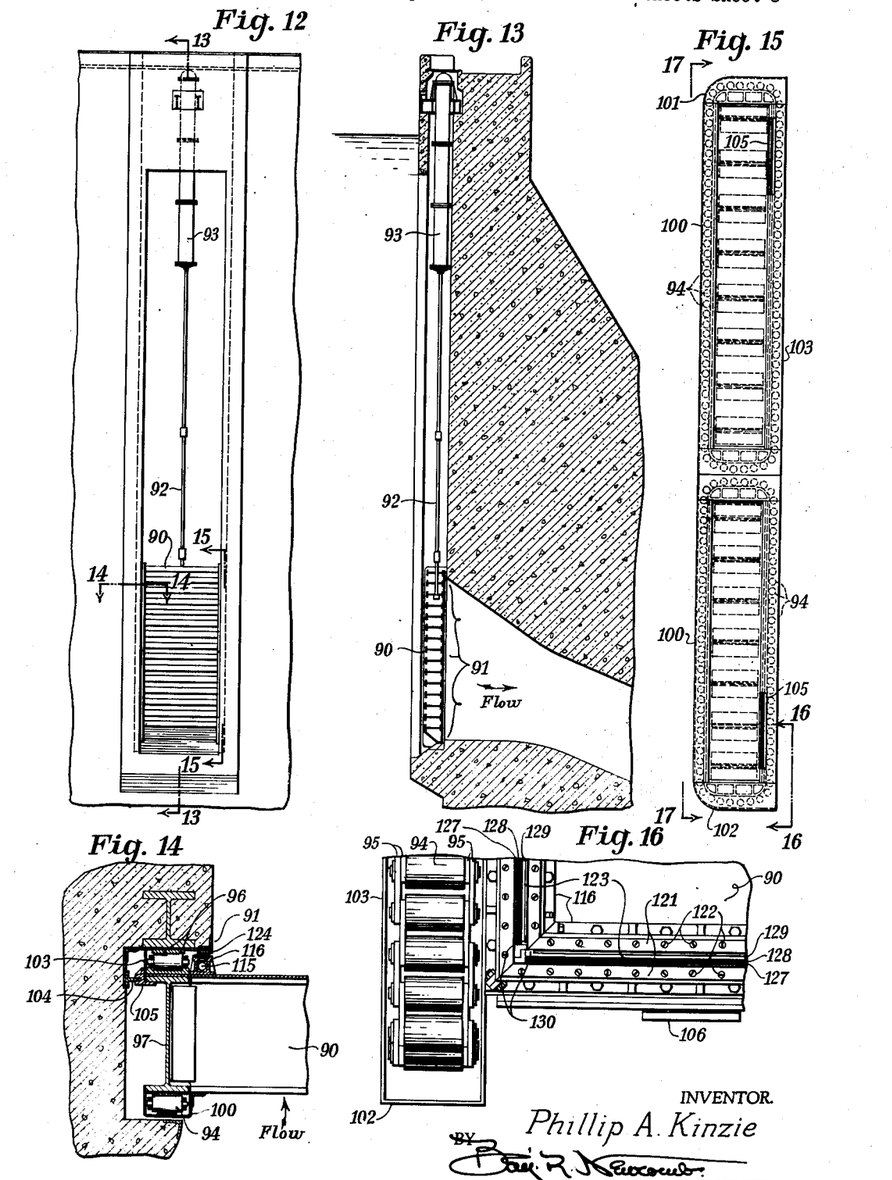
Fig. 12 is an upstream elevation of an alternate type of gate structure embodying the invention.
Fig. 13 is a section taken on the plane 13—13 of Fig. 12.
Fig. 14 is a section taken on the plane 14—14 of Fig. 12.
Fig. 15 is an enlarged view taken on the plane 15—15 of Fig. 12.
Fig. 16 is a fragmentary view taken on the plane 16—16 of Fig. 15.

The second embodiment of the invention as illustrated by Figs. 12 to 22, depicts a rectangular gate leaf 90 which is mounted on the upstream face of a dam and which is provided with a rectangular seal for sealing around the perimeter of the orifice 91—Figs. 13 and 14.

The gate leaf 90 is raised or lowered by the stem 92—Figs. 12, 13, 17, 18 and 19—which is connected to a piston in the hydraulic hoist cylinder 93—Figs. 12 and 13. The gate leaf is mounted on dual trains of rollers 94—Figs. 14, 15, 16, and 19—which are connected by the links 95—Figs. 16 and 19—and which roll upon the tracks 96—Fig. 14—on the face of the dam. In order to avoid the use of secondary members for supporting the roller trains, the rollers 94 are located directly under the vertical beams 97—Fig. 14—on the gate leaf 90. Since there are two roller trains on the gate leaf 90, the vertical beams cannot be continuous; therefore, the spanner beams 98—Fig. 17—are provided to carry the load of the intermediate beam 99. This unique construction—that of mounting a roller train or a series of roller trains on the centerline of a vertical girder which forms a side of the gate leaf and which can be discontinuous—is very advantageous in gates of considerable height.

The U-shaped cover 100, top and bottom covers 101 and 102, and the side plates 103—Figs. 14, 15, 16, and 17—protect the roller trains from undue intrusion of foreign matter. The T-shaped track 104—Fig. 14—which is received in the slotted guides 105—Figs. 14 and 15—on the gate leaf 90, keeps the gate leaf in proper alignment during raising or lowering.

Figure 17:
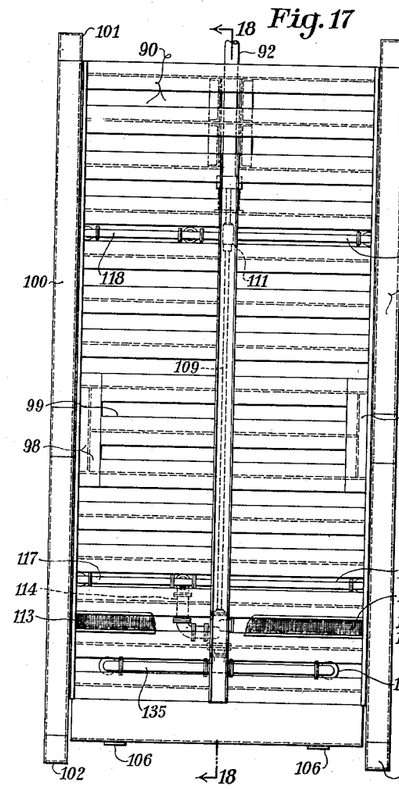
Fig. 17 is a view taken on the plane 17—17 of Fig. 15.
Figures 18, 19:
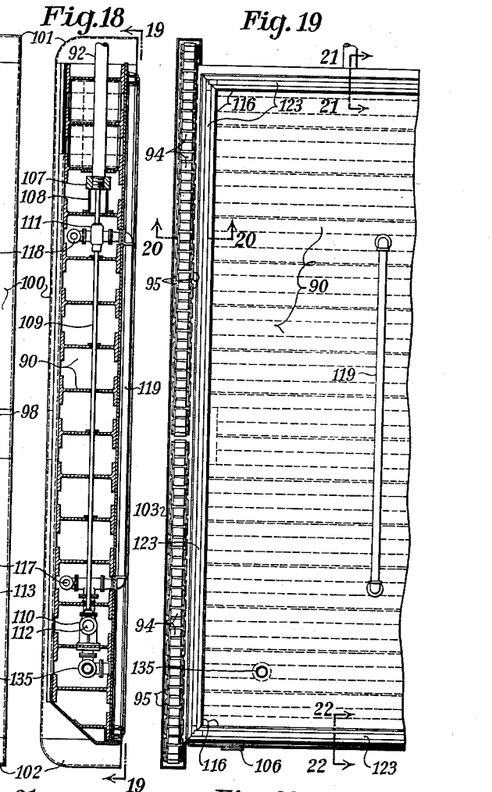
Fig. 18 is a section taken on the plane 18—18 of Fig. 17.
Fig. 19 is a view taken on the plane 19—19 of Fig. 18.
Figure 20:
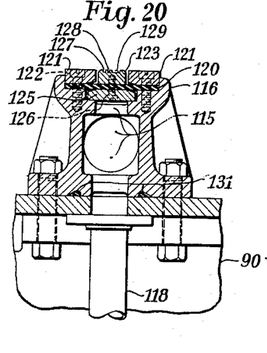
Figs. 20, 21 and 22 are enlarged fragmentary sections taken, respectively, on the planes 20—20, 21—21, and 22—22, of Fig. 19.

In closing the orifice 91 the gate leaf 90 is lowered until the stop plates 106—Figs. 16, 17, and 19—rest upon mating stops on the floor of the gate slot. The movement of the stem 92, however, does not stop but travels downward a little farther until the lifting collar 107—Fig. 18—comes to rest against the cylindrical stop 108. This additional travel is transmitted downward by the shaft 109 to the seal control valve 110, which is protected against damage from overtravel by the spring-loaded coupling 111. The downward movement of the shaft 109 will admit fluid pressure from the upstream face of the gate leaf 90 to the seal control valve 110 through the port 112—Fig. 18. The screen 113—Fig. 17—prevents foreign matter from being drawn into the port 112. The pipe 114—Fig. 17—delivers fluid from the port 112 to the space 115—Figs. 14, 20, 21, and 22—in the seal retainer 116, through the lower horizontal pipes 117 and through the upper horizontal pipes 118—Figs. 17 and 20—which are connected to the pipe 114 by the vertical pipe 119—Figs. 18 and 19—on the downstream face of the gate leaf 90.

Introduction of fluid pressure into the space 115—Figs. 14, 20, 21, and 22—will cause the flexible diaphragm 120, which is secured to the seal retainer 116 by the clamp bars 121 and screws 122, to be forced outward and bring the seal bars 123 into contact with a cooperating seat 124—Fig. 14—on the dam around the orifice 91. The seal bars 123—Figs. 16, 19, 20, 21, and 22—are retained on the flexible diaphragm 120 by the stop bars 125 and the screws 126. The cross sectional contour of the seal bars 123 is similar to that in the embodiment hereinbefore described, and function in a similar manner—the grooves 127 and 128 being resistance grooves while the groove 129, by relief of pressure from part of the seal contact surface through the slots 130—Fig. 16—to the non-pressure space of the orifice 91, permits greater contact pressure of the seal bars 123, on the seat 124.

The relief of pressure from approximately one-half of the seal contact surface serves another purpose. It will be apparent from study of Figs. 20, 21, and 22, that, since one side of the seal bars 123 will be under pressure whereas the other will not, there will exist a force tending to move the seal toward the non-pressure side. Since this force will be resisted by the diaphragm 120, there will be set up a torsional moment in the seal bars 123 tending to rotate the seals, as illustrated for example in Fig. 20, in a clockwise direction. This torsional moment is counteracted by an anticlockwise torsional moment produced by pressure in space 115. Since balanced pressure exists over only approximately one-half of the width of the seal, it is apparent that there will be a tendency to rotate the seal in the direction of the unbalanced force. Since the unbalanced force would tend to cause counterclockwise rotation and since it is approximately equal to the clockwise force, the two rotational forces will nearly cancel each other, and leave a resultant force which is approximately perpendicular to and which acts outward on the seal bars 123 forcing it on to the seat 124.

This condition is true for the ring seal hereinbefore described, but since the seal is circular and continuous, the torsion could be resisted by the ring; however, in seals utilizing straight bars it is necessary that the rotational tendencies cancel each other, and that the final resultant force be one which is nearly normal to the contacting surface of the seal and seat. The ideal condition would obviously be to have the resultant force vertical to, and passing through the centerline of the seal. By the contour and disposition of the seal and appurtenant elements this ideal result has been closely approached.

The junctions of the seal bars 123 at the corners—Figs. 16 and 19—are step cut to minimize leakage past the seal. Leakage of fluid past the joint where the seal retainer 116 is bolted to the gate leaf 90 is prevented by the rubber gaskets 131—Figs. 20, 21 and 22.

Figures 21, 22:
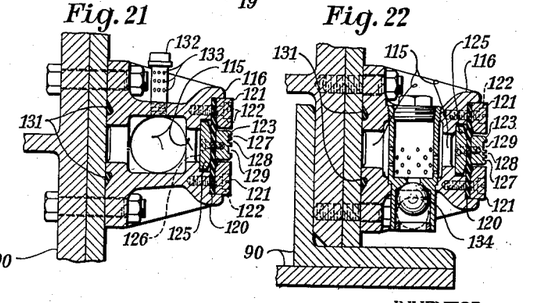

A means for venting entrapped air from the space 115 is provided by the pipe 132—Fig. 21—which is provided with a number of small holes 133. Inasmuch as the fluid pressure in the space 115 and on the side of the seal retainer where the pipe 132 exhausts air is the same, the intercommunication will not affect the seal. The same facts are true for the ball check 134—Fig. 22—which will be in the position shown by the dotted line when the gate leaf is closed and the orifice 91 is sealed by the bars 123. The function of the ball check is to provide an automatic drain for the space 115 at such times as the gate leaf is removed for inspection or service.

In opening the orifice 91 by raising the gate leaf 90 all pressure in the space 115 is automatically released allowing the seals 123 to retract before movement of the gate leaf 90 is started; for when the stem 92 begins to raise, the upward travel of the connected shaft 109 will close off the port 112 in the control valve 110, and at the same time bring the system of piping connecting space 115 into communication with the pipe 135—Figs. 17, 18, and 19. Since the pipe 135 has dual outlets on the downstream and, therefore, non-pressure side of the gate leaf 90, the pressure behind the seals will be exhausted and allow them to retract before movement of the gate leaf 90 starts. The ball check 134, when the pressure is relieved as described, will be forced upward on to its seat as shown in Fig. 22.

Whereas in the foregoing embodiments the sealing means have been illustrated and described as being upon the leaf or orifice-closure means, it will be apparent that the relationship of the sealing means and seat element could readily be reversed; that is to have the sealing means around the orifice and to have the cooperating seat element on the orifice-closure means. In reversing the relationship of the sealing means and seat element, none of the principles disclosed herein pertaining to the seal would be altered and the efficacy thereof would be unimpaired. Furthermore, the use of the invention in such a relationship is contemplated, and its use in this manner does not depart from the spirit of the invention.

From the foregoing description of the details of two specific embodiments of the invention, the utility, adaptability, and novelty can be appreciated; and whereas in the foregoing description there has been described the specific embodiments of the invention for the purpose of satisfying the Patent Statutes, it is nevertheless, to be understood that in practicing the same, the use of any or all combinations and modifications falling within the scope of the appended claims defining the invention is intended.

I claim:

1. In combination with fixed and movable parts forming respectively an orifice and a gate leaf for controlling the flow of fluid through the orifice, means including an operating stem for moving the leaf transversely of the orifice into open and closed positions, said fixed and movable parts each having means providing a sealing surface axially aligned with a companionate sealing surface on the other part in the closed position of the leaf, at least one of said parts including a pressure-responsive sealing element movably supported on said part and providing the associated sealing surface for said part, means for maintaining separation between said surfaces throughout movement of said gate leaf, and means for effecting contact between said surfaces automatically in response to movement of said leaf into the closed position, said last named means including a fluid pressure connection for transmitting pressure of the upstream fluid to said sealing element and means connected to said stem for opening and closing said connection.

2. In fluid flow apparatus, relatively movable parts forming respectively an orifice and a gate leaf for controlling the flow of fluid through the orifice, means for moving the leaf relative to the orifice into open and closed positions, means forming a seal between said parts in the closed position of said gate leaf including means providing companionate sealing surfaces on said parts, at least one of said parts having a recess formed therein and opening outwardly toward the other part, a resilient member bridging said recess, a sealing element carried by said resilient member and providing the associated sealing surface of said part, and means admitting fluid under pressure to said recess to cause flexure of said resilient element and thereby move said sealing element to establish contact between said sealing surfaces.

3. In fluid flow apparatus, relatively movable parts forming respectively an orifice and a gate leaf for controlling the flow of fluid through the orifice, means for moving the leaf relative to the orifice into open and closed positions, means forming a seal between said parts in the closed position of said gate leaf including means providing companionate sealing surfaces on said parts, at least one of said parts having a recess formed therein and opening outwardly toward the other part, a diaphragm bridging said recess, a sealing element carried by said diaphragm and providing the associated sealing surface of said part, means admitting fluid under pressure to said recess to cause flexure of said diaphragm and thereby move said sealing element to establish contact between said sealing surfaces, and means adjacent opposite surfaces of said diaphragm cooperating to limit outward movement of said diaphragm and sealing element.

4. In fluid flow apparatus, relatively movable parts forming respectively an orifice and a gate leaf for controlling the flow of fluid through said orifice, said parts having cooperating sealing surfaces adapted to contact one with another in the closed position of said leaf to form a seal, a sealing element flexibly supported on one of said parts and providing the associated sealing surface of said part, means for maintaining said sealing surfaces in spaced relation during movement of said leaf, and fluid pressure means for moving said sealing element to establish contact between said surfaces upon cessation of movement, said surfaces being exposed along opposite margins of their widths to upstream and downstream fluid pressures respectively, approximately one-half of the sealing surface of said sealing element adjacent the source of upstream fluid pressure being formed with relatively narrow and spaced grooves separated and defined by continuous walls to resist the passage of fluid through said seal, the remaining surface portion being formed with a relatively wide groove having an interrupted defining wall adjacent the region of downstream fluid pressure for the relief of pressure from within said groove.

5. In fluid flow apparatus, relatively movable parts forming respectively an orifice and a gate leaf for controlling the flow of fluid through said orifice, said parts having cooperating sealing surfaces adapted to contact one with another in the closed position of said leaf to form a seal, a sealing element flexibly supported on one of said parts and providing the associated sealing surface of said part, means for maintaining said sealing surfaces in spaced relation during movement of said leaf, means for moving said sealing element to establish contact between said surfaces upon cessation of movement by the application of fluid pressure to said element of a value substantially the same as the pressure of the controlled fluid, and means for applying said fluid pressure, said surfaces being exposed along opposite margins of their widths to upstream and downstream fluid pressures respectively, approximately one-half of the sealing surface of said sealing element adjacent the source of upstream fluid pressure being formed with relatively narrow and spaced grooves separated and defined by continuous walls to resist the passage of fluid through said seal, the remaining surface portion being formed with a relatively wide groove having an interrupted defining wall adjacent the region of downstream fluid pressure for the relief of pressure from within said groove.

6. In combination with fixed and movable parts forming respectively an orifice and a gate leaf for controlling the flow of fluid through the orifice, means including an operating stem for moving the leaf transversely of the orifice into open and closed positions, said fixed and movable parts each having means providing a sealing surface axially aligned with a companionate sealing surface on the other part in the closed position of the leaf, at least one of said parts including a pressure-responsive sealing element movably supported on said part and providing the associated sealing surface for said part, means for maintaining separation between said surfaces throughout movement of said gate leaf, and means for effecting contact between said surfaces automatically in response to movement of said leaf into the closed position, said last named means including a fluid pressure connection for transmitting pressure of the upstream fluid to said sealing element, a valve in said fluid pressure connection movable with said leaf, and means connected to said stem for operating said valve.

7. In fluid flow apparatus, relatively movable parts forming respectively an orifice and a gate leaf for controlling the flow of fluid through the orifice, means forming a seal between said parts in the closed position of said gate leaf including means providing companionate sealing surfaces on said parts, a sealing element movable axially of said orifice and providing the associated sealing surface of one of said parts, resilient means positively connected to said element for supporting said element on said part, said resilient means being capable of flexure in one direction upon application of fluid pressure thereto, said flexure acting to establish contact between said sealing surfaces, said resilient means retractable in the opposite direction upon relief of said pressure to break said contact, and means for applying and relieving said fluid pressure to actuate said resilient supporting means and thereby said connected sealing element.

8. In fluid flow apparatus, relatively movable parts forming respectively an orifice and a gate leaf for controlling the flow of fluid through the orifice, means forming a seal between said parts in the closed position of said gate leaf including means providing companionate sealing surfaces on said parts, a sealing element movable axially of said orifice and providing the associated sealing surface of one of said parts, resilient means positively connected to said element for supporting said element on said part, said resilient means being capable of flexure in one direction upon application of fluid pressure thereto substantially that of the controlled fluid, said flexure acting to establish contact between said sealing surfaces, said resilient means being retractable in the opposite direction upon relief of said pressure to break said contact, and means for applying and relieving said fluid pressure to actuate said resilient supporting means and thereby said connected sealing element.

9. In combination with a gate valve housing having upstream and downstream openings to provide a passageway for fluid, a gate leaf movable transversely of said passageway into open and closed positions for controlling the flow of fluid therethrough, said housing and gate leaf having cooperating sealing surfaces in parallel planes adapted to contact one with another in the closed position of said leaf to form a seal in one of said planes at the perimeter of the upstream opening, a sealing element movable axially of said passageway and providing one of said cooperating sealing surfaces, means for maintaining said surfaces in spaced relation during movement of said gate leaf including adjustable means cooperatively associated with said leaf and housing for maintaining a clearance between said upstream sealing surfaces less than the clearance between said leaf and housing at the downstream side, thereby maintaining a minimum fluid pressure within said housing to relieve back pressure on said element, means for establishing contact between said sealing surfaces in response to fluid pressure applied to said element at substantially the pressure of the upstream fluid including means for applying said fluid pressure, and means for limiting axial movement of said sealing element to substantially the width of the adjusted upstream clearance space whereby damage to the relatively movable parts is avoided should the sealing pressure be applied while the gate leaf is in an open position.

10. In combination with a valve housing having oppositely disposed openings for the flow of fluid therethrough, a gate leaf disposed within said housing and movable transversely of said openings into open and closed positions relative thereto, said housing and leaf having cooperating sealing surfaces in spaced planes adapted to contact one with the other in the closed position of said leaf to form a seal at the perimeter of the upstream opening, a sealing element movable axially of said upstream opening in response to fluid pressure and providing one of said cooperating sealing surfaces, said surfaces being exposed along one margin to upstream fluid pressure and along the opposite margin to the fluid pressure existing within said housing, approximately one-half of the sealing surface of said sealing element adjacent the source of upstream fluid pressure being formed with relatively narrow and spaced grooves separated and defined by continuous walls to resist the passage of fluid through said seal, the remaining surface portion being formed with a relatively wide groove having its outer defining wall interrupted for the relief of pressure from within said groove to the interior of said housing, means for maintaining a clearance between said cooperating surfaces during movement of said leaf, means for continuously maintaining a greater clearance between said leaf and said housing at the downstream side, thereby maintaining a minimum fluid pressure within said housing to relieve back pressure on said element, and means for establishing contact between said surfaces in response to fluid pressure applied to said element at substantially the pressure of the upstream fluid including means for applying said fluid pressure.

11. In apparatus for controlling the flow of fluid, a stationary structure providing a fluid flow orifice, a movable structure constituting a gate for controlling the flow of fluid through said orifice, operating means for moving said gate transversely of said orifice into open and closed positions, said fixed and movable structures each having means providing a sealing surface axially aligned with a companionate sealing surface on the other structure in the closed position of said gate, pressure-responsive sealing means on one of said parts providing the associated sealing surface for said part, means for maintaining separation between said surfaces throughout movement of said gate, and means for effecting contact between said surfaces automatically in response to movement of said gate into the closed position, said last named means including a fluid pressure connection for transmitting fluid pressure to said sealing means and means operatively connected to said operating means for controlling the transmission of fluid pressure through said connection.

12. A hydraulic structure comprising a frame having a floor, a gate movable with respect to said frame and having a hoisting element by means of which the gate is moved towards and away from said floor, an expansible sealing means for sealing the joint between said frame and said gate, a control means mounted on said gate for controlling the supply of fluid under pressure to said sealing means, and means operatively connecting said control means with said hoisting element and operable when the gate engages said floor for operating said control means to effect inflation of said sealing means.

13. In apparatus for controlling the flow of fluid, a stationary structure providing a fluid flow passage having a floor portion, a movable structure constituting a gate movable with respect to said stationary structure into and out of engagement with said floor portion for controlling the flow of fluid through said passage, a hoisting element by means of which said gate is moved towards and away from said floor portion, means for sealing the joint between said structures, said sealing means having a sealing portion movable into sealing position and having integral resilient means for moving said sealing portion, said resilient means being capable of flexure upon the application of fluid pressure thereto, said flexure acting to move said sealing portion into sealing position, control means mounted on said gate for controlling the supply of fluid under pressure to said resilient means, and means operatively connecting said control means with said hoisting element and operable when said gate engages said floor portion for operating said control means to effect flexure of said resilient means.

PHILLIP A. KINZIE.